United States Patent [19]

Palman

[11] 3,722,949
[45] Mar. 27, 1973

[54] WINDSCREEN FILTERS

[76] Inventor: Leonard Palman, 5 Windsor Close, Hendon Lane, London, England

[22] Filed: Apr. 14, 1971

[21] Appl. No.: 133,994

[30] Foreign Application Priority Data

Apr. 20, 1970 Great Britain.....................18,735/70

[52] U.S. Cl. ............................296/97 C, 296/97 K
[51] Int. Cl. ................................................B60j 3/02
[58] Field of Search.......296/97 R, 97 C, 97 H, 97 K; 248/302; 224/29 A

[56] References Cited

UNITED STATES PATENTS

| D149,104 | 3/1948 | Baratelli et al................296/97 C X |
| 1,717,185 | 6/1929 | Caldwell........................296/97 K X |
| 2,701,612 | 2/1955 | Steidl............................296/97 C X |
| 845,325 | 2/1907 | Zorn..............................248/302 X |
| 2,096,142 | 10/1937 | Stover..............................296/97 C |
| 2,831,726 | 4/1958 | Ralston............................296/97 C |
| 2,757,955 | 8/1956 | Chester...........................296/97 C |

Primary Examiner—Benjamin Hersh
Assistant Examiner—Leslie J. Paperner
Attorney—Woodard, Weikart, Emhardt & Naughton

[57] ABSTRACT

A filter for reducing glare and useful as a windscreen filter for vehicles is angularly displaceable relative to a support by means of a hinge to an "in use" position. The hinge is resilient to permit removal of the filter from the support.

In a preferred embodiment a wire frame is clipped on to the sum blind of, for example, a car, and has end portions which by virtue of the shape and resilience of the wire frame are retained in a hinge bracket on the filter to permit angular displacement of the filter about the so formed hinge.

2 Claims, 10 Drawing Figures

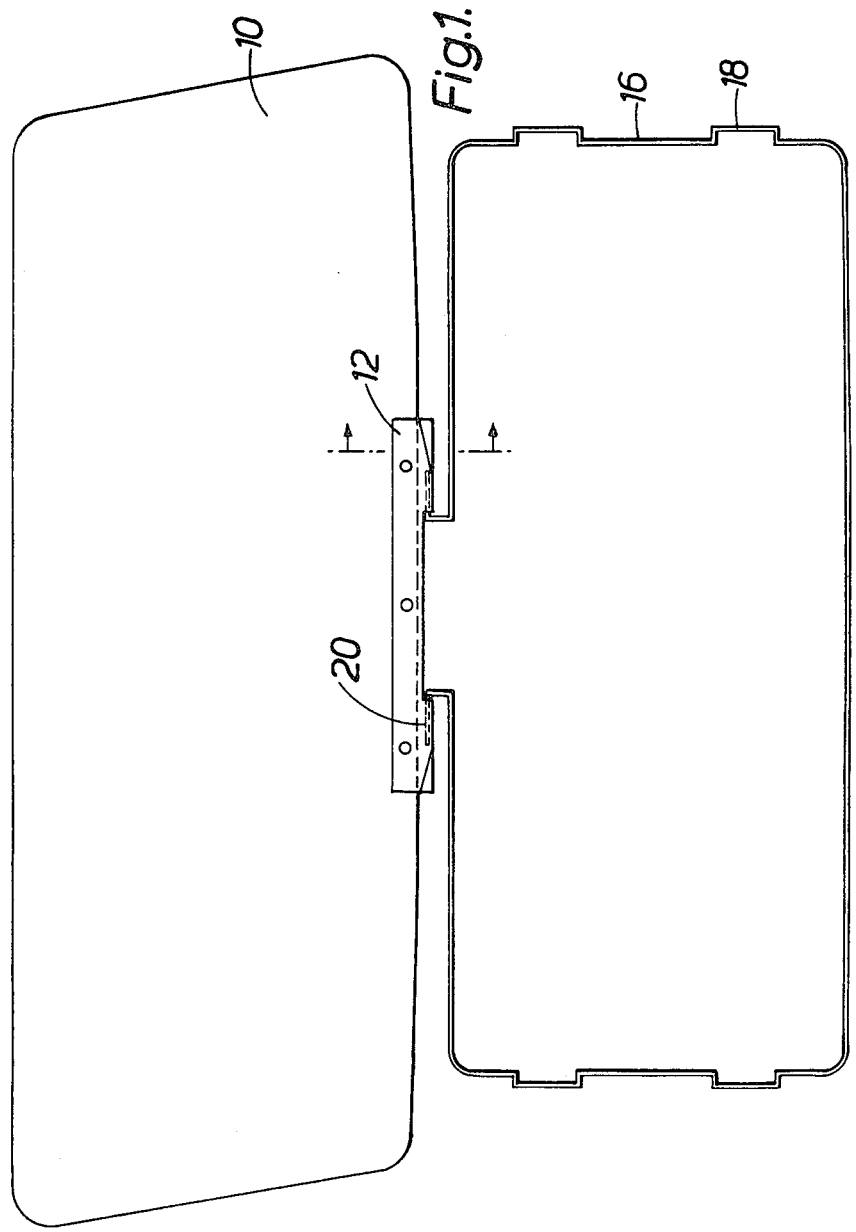

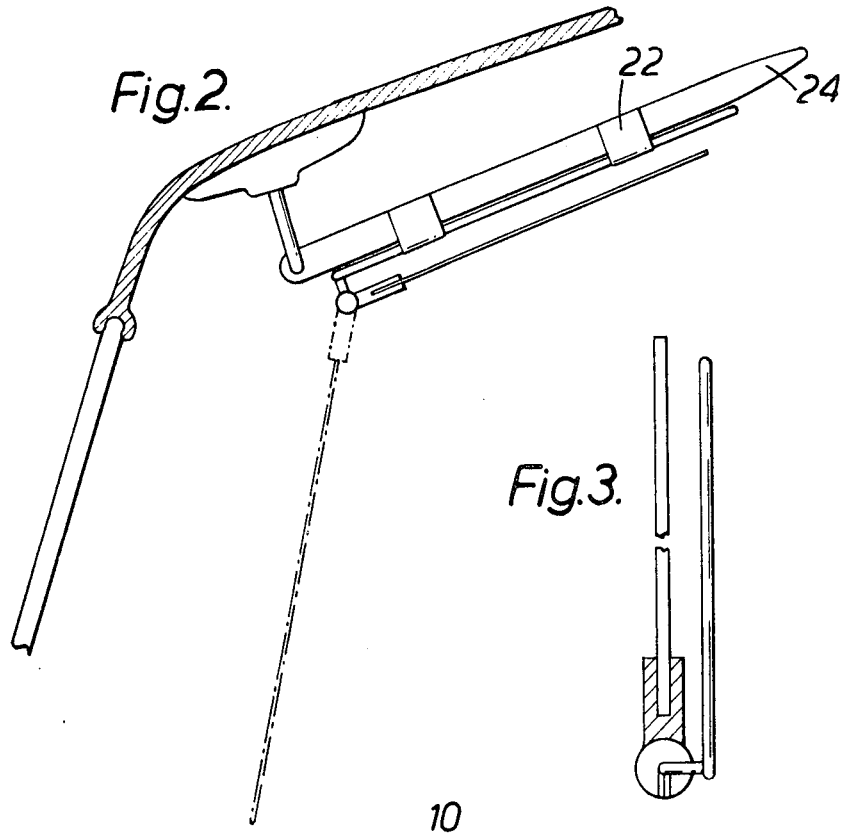

Patented March 27, 1973

INVENTOR
LEONARD PALMAN
BY
Woodard, Weikart, Emhardt & Naughton
ATTORNEYS

INVENTOR
LEONARD PALMAN
BY
Woodard, Weikart, Emhardt & Naughton
ATTORNEYS

WINDSCREEN FILTERS

This invention relates to a filter for use in reducing the glare from the sun or other bright source of light, and more particularly to filters for use on the windscreens of vehicles and vessels.

Many types of filters are available for attachment to the windscreens of motor vehicles, boats, etc. Some may be attached to a windscreen by means of suction pads and others attached directly by means of adhesive. Both these methods of attachment have disadvantages. For example, suction pads are unsightly and not very reliable, especially when the support, i.e. the windscreen of the vehicle, is subject to vibration. In the case where adhesives are used, a driver is not able to attach or detach the filter without inconvenience and certainly not without stopping his vehicle. Another disadvantage of attaching a filter to a windscreen by means of an adhesive is that air is inevitably trapped between the filter and the screen, thus giving rise to the danger of "misting."

According to this invention a windscreen filter comprises a filter member angularly displaceable relative to a support member by means of a hinge pin associated with one member and a hinge bracket associated with the other member containing a hole into which the hinge pin is biassed thereby permitting relative angular displacement of the members about the hinge and separation of the two members by withdrawal of the hinge pin from the hole against the action of the biassing means.

Preferably, the hinge pin is associated with and may conveniently be integral with the support member, the hinge bracket being attached to the filter.

According to one embodiment of the invention, the support member comprises a wire frame having portions which constitute hinge pins and that the shape of the frame and the elasticity of the wire afford a means whereby each end portion of the wire is biased (to return to the equilibrium position) into a hole in the hinge bracket.

The invention will now be described by way of example with reference to the accompanying drawings, in which:

FIG. 1 shows one form of windscreen filter having a filter member and a wire mounting frame;

FIG. 2 shows the windscreen filter of FIG. 1 attached to a sun-shield;

FIGS. 3 and 3A show a cross-section on the line A—A of FIG. 1;

Figure 4:
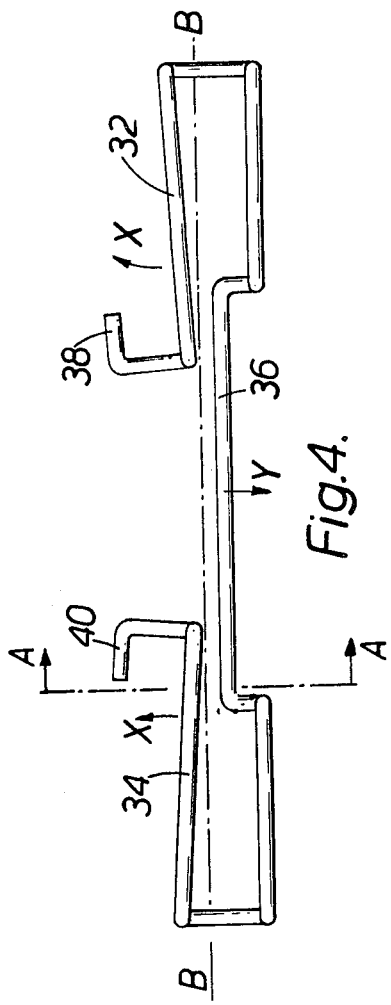
FIG. 4 shows an alternative form of wire mounting frame.

FIG. 1 shows a trapezoidal sheet of material which forms the filter member or visor 10 to which is riveted a hinge 12. A wire frame 16 made of a single piece of wire is bent into a generally rectangular shape having four protusions 18 formed two in each of the shorter sides of the frame. Each of the ends of the wire is bent in such a manner that it may be placed in one of the holes 20 formed in the hinge 12 as shown in the Figure. The visor and supporting member or frame are angularly displaceable relative to each other about the hinge, the tendency of the wire frame to resist collapse being sufficient to prevent separation of the frame and the hinge during angular displacement.

FIG. 2 shows the frame or support member (of FIG. 1) attached, by means of straps 22 which may be made of an elastic material or may be adjustable in length, to a sun blind 24 of the type commonly fitted to motor vehicles. The visor is displaceable to a position (shown dotted) adjacent to the windscreen, thereby providing a filter for protecting the eyes of the driver against glare.

FIGS. 3 and 3A are views on line A-A in FIG. 1, which show a means whereby the visor is locked in either the "up" or the "down" position. The ends of the wire which are inserted in the holes of the hinge are bent to lie in a plane at an angle to the plane of the rectangular frame to permit the visor to lie flat against the sun blind 24 in the "up" position. Thus by forming grooves 26 and 28 in one of the inner end faces of the hinge 12 or suitable nylon bushes it is possible to utilize the tendency of the frame 16 to resist collapse in locking the visor in either the "up" or the "down" position. During displacement the wire will encounter one of the grooves, spring outwardly into the groove and thus prevent subsequent displacement until a force large enough to overcome the resilience of the frame is applied.

It will be appreciated from the foregoing that the elastic straps 22 serve a dual function, namely (1) to secure the visor in position, and (2) to apply a force on the frame so that the visor may be placed in any selected position, either "up" or "down" or in a position intermediate the "up" and "down" positions.

Figure 5:
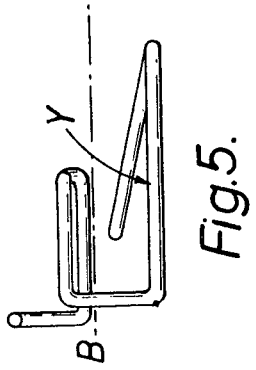
FIG. 5 is an end elevation of the frame shown in FIG. 4.
Figure 6:
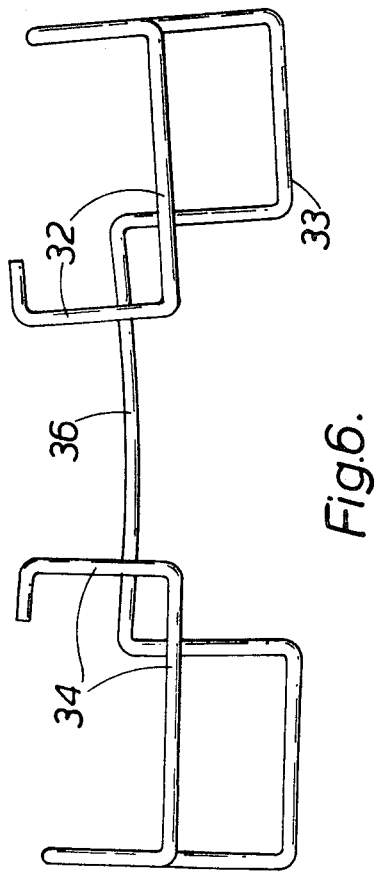
FIG. 6 is a plan view of the frame shown in FIG. 4.

An alternative and preferred form of wire frame 30 or support member is shown in FIGS. 4 to 6. The frame 30 is made from a single length of wire formed so as to enable the frame to clip onto any one of the wide variety of sun blinds commonly fitted to motor vehicles.

The shape of the frame shown in the figures corresponds to an equilibrium position in which the wire is unstrained however, when the frame clips on to a sun blind the frame distorts and the wire is strained. Wings 32 and 34 and a central portion 36 of a further wing 33 deflect in a direction indicated by arrows X and Y respectively, as the frame 30 is clipped over a sun blind (not shown) in a position indicated at BB. The sun blind 37 is supported by a rod 37A. All motor vehicle sunblinds are supported in this manner and it is this common feature which enables use of the frame in conjunction with all types of cars and motor vehicles having sunblinds.

Figure 7:
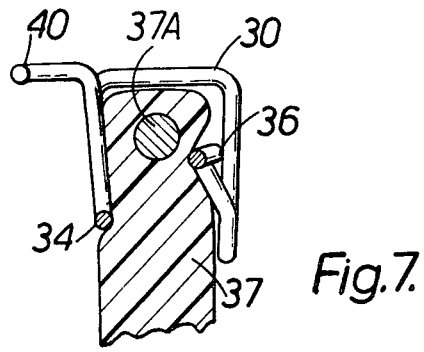
FIG. 7 is a cross-sectional view on A—A of FIG. 4 but with the frame clipped on a sun blind.
Figure 8:
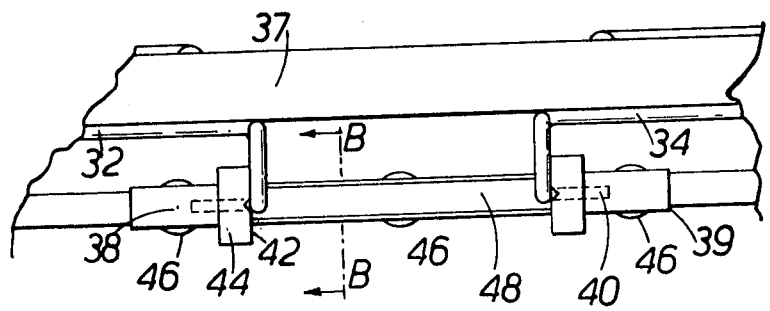
FIG. 8 shows details of a hinged connection between a visor and a sun blind.
Figure 9:
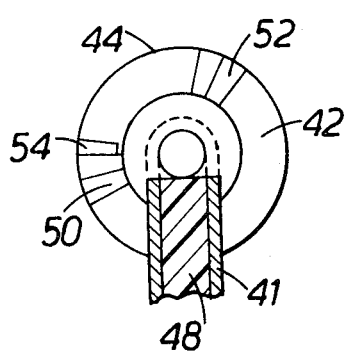
FIG. 9 is a cross-sectional view on B—B of FIG. 8 but with the wire frame removed for clarity.

The resilience of the frame causes the portion 36 and wings 32 and 34 to compress the sunblind (as shown in FIG. 7) at one side of the rod 37A and thereby retain the frame on the sunblind irrespective of the orientation of the sunblind.

When the wings 32 and 34 deflect to accommodate the sunblind 37 (FIG. 7) end portions 38 and 40 constituting the hinge pin are brought into alignment and are biassed into the hinge bracket 39 so that the wire adjacent each of those portions abuts against an inner end face 42 of a nylon bush 44. The hinge bracket 39 is made from a slotted metal plate 41 formed into a U-shape and attached by rivets 46 to an edge portion of the visor 48.

Notches 50 and 52 are provided in the face 42 of the bush 44 to retain the visor in an "up" and "down" position respectively. In certain circumstances, for example when the sunblind is subject to abnormal vibration or when the visor has been quickly moved into the "up" position, it is conceivable that the resilience of the wire frame 30 will be insufficient to retain the wire in the groove 50 and the visor would therefore fall. To avoid this, a projection 54 is provided beside the notch 50 so that a deliberate external force is required to displace the visor angularly and lift the wire from the groove and over the projection.

The position of the notches 50 and 52 determines the relative angular position of the sunblind and visor in the "up" and in the "down" position. However, the angular position of the visor relative to, for example the windscreen or the headlight beam of a following vehicle, may be adjusted by angularly displacing the sunblind to avoid reflected glare. Normal use of the sunblind is not impaired by the attachment of a visor.

Many modifications of the invention are possible. For example, if sunblinds are not fitted it would be possible to attach the support member to the body of a car or boat, in which case the support member need only be a simple bracket having a spring loaded means for attachment to the visor.

Another useful modification would be to use a visor made of light polarizing material rather than a simple colored filter. In this way the amount of reflected light, which is a major contributor to glare, reaching the driver is substantially reduced.

It is an advantage of the above described embodiment of the invention that no alterations to the interior of the vehicle are required in order to fit a windscreen filter according to this invention. Further the windscreen filter is not a permanent fixture, it is inconspicuous when not in use and does not impair the use of any other accessory or fixture including the sunblind to which the windscreen filter is attached.

I claim:

1. A windscreen filter assembly comprising a filter member angularly displaceable relative to a support member, said filter member carrying hinge members having two spaced opposed faces each having an aligned aperture therein adapted to receive oppositely extending hinge pintles, said support member being formed of a single piece of wire having a configuration providing at least one pair of wing portions forming a dihedral angle therefrom and the end portions of said wire forming said oppositely extending hinge pintles and engaging said hinge member faces, said hinge member faces having detent notches therein to accommodate said wire end portions and thereby define an extended and a retracted position for said filter member with respect to said support member, at least one of said hinge member faces carries an abutment adjacent one of said detent notches to more sharply define its detent position for said filter member.

2. A windscreen filter assembly as claimed in claim 1 in which said support element is formed to provide two laterally spaced pairs of wings adapted to receive a flat support member in the dihedral angle formed between each wing pair, said support member end portions being moved to aligned relation with respect to said hinge member apertures when the flat support member is seated in the bight of said dihederal angle.

* * * * *